Dec. 29, 1953   W. S. SWIFT   2,664,290
BOWLING FOUL INDICATOR
Filed March 25, 1950

INVENTOR,
Walter S. Swift
BY Charles Shepard
Attorney

Patented Dec. 29, 1953

2,664,290

UNITED STATES PATENT OFFICE 2,664,290

BOWLING FOUL INDICATOR

Walter S. Swift, East Rochester, N. Y., assignor to Edward J. Doyle, Rochester, N. Y.

Application March 25, 1950, Serial No. 151,960

9 Claims. (Cl. 273—50)

This invention relates to a foul indicator or detector for bowling alleys.

Many attempts have been made to provide automatic foul indicators for bowling alleys, but most of the prior constructions are relatively complex, due at least in part to the designer's attempt to provide a complete foul indicator which will register every possible type of foul. Many of these prior foul indicators not only have complex, costly, and hard-to-service electric circuits, but also have been difficult and expensive to install, requiring in at least some instances the rather extensive mutilation of the bowling alley, so that the alley is at least disfigured if not actually left in a damaged condition if it is desired to remove the foul indicator permanently.

It is, accordingly, an object of the present invention to provide a foul indicator or detector which is simple and inexpensive to build and to install and to service or maintain in operative condition, and which requires no substantial mutilation of the bowling alley in connection with installation of the foul indicator, so that the alley remains entirely sightly and suitable for use even if it is desired to remove the indicating mechanism.

Another object of the invention is the provision of a foul indicator so designed and constructed as to give an indication of those fouls or types of fouls which most commonly occur and which are most difficult to detect by normal visual inspection, the apparatus being so designed that it does not ordinarily respond to or give an indication of the comparatively rare types of fouls, which are, however, quite obvious to the player himself and to others observing the game, so that they are easily detected by casual visual inspection. This exclusion of the less frequent and more obvious types of fouls from the scope of the apparatus enables a great simplification of the apparatus as compared with many of the prior foul indicators.

A further object of the invention is the provision of a foul indicator in which the electric circuit parts which are most likely to need servicing or attention of any kind, are encased within a small, light, and compact box or casing of a portable nature, which is simply plugged into the permanently fixed parts of the electric circuit, so that when anything goes wrong with the apparatus, it can in most cases be remedied practically instantly by unplugging the box or casing containing the electronic circuit parts and plugging in a duplicate box, whereupon the first box may be taken by the service man to his own shop where it may be worked upon at leisure and with greater efficiency than could be done if the electronic circuits had to be serviced at the bowling alley location.

A still further object of the invention is the provision of a bowling foul indicator operating upon electronic principles, so designed and constructed as to eliminate or greatly reduce the possibility of interference or faulty operation as a result of other electrical apparatus in the neighborhood, such as electric motors, or neon signs.

These and other desirable objects are accomplished by the construction disclosed as an illustrative embodiment of the invention in the following description and in the accompanying drawings forming a part hereof, in which.

The same reference numerals throughout the several views indicate the same parts.

Figure 1:
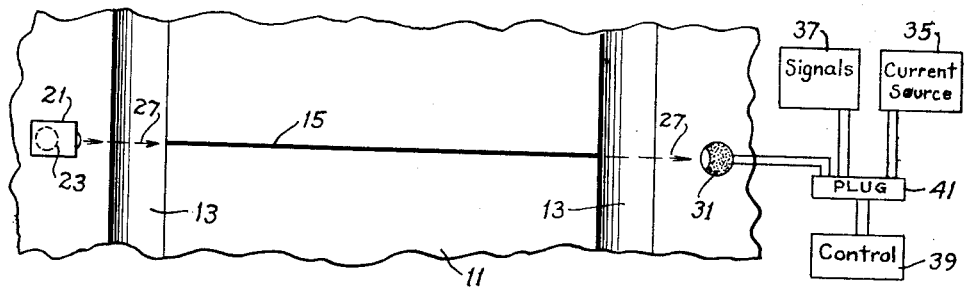
Fig. 1 is a fragmentary plan of the portion of a bowling alley adjacent the foul line, with the present invention applied thereto, the invention being illustrated partly in schematic diagram.
Figure 2:
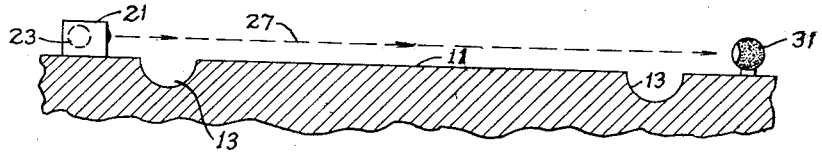
Fig. 2 is a transverse vertical section through a bowling alley at the foul line, showing parts of the present invention.

Referring now to Figs. 1 and 2 of the drawings, there is shown a fragment of the usual bowling alley 11 having the usual gutters 13, and a foul line 15 marked on the alley by means of a line of paint or other suitable form of marking. Under the rules of the game, no part of the player's body or clothing is allowed to touch the foul line or the alley floor beyond (that is, forwardly of) the foul line 15, while the player is in the act of rolling or projecting a ball down the alley. The most common type of foul is one in which the player's foot is placed on the alley floor just a short distance (perhaps only a fraction of an inch) onto or beyond the foul line. If the foot is very quickly withdrawn from this position, a foul of this kind is very difficult to detect by ordinary visual observation, and the player himself may even be unaware that his foot has illegally crossed the foul line. It is fouls of this kind which the present apparatus is intended to indicate.

Other fouls of a less frequent kind are those in which, for example, the player may lose his balance just as he lets go of the ball at the end of his forward swing, and to regain his balance or keep from falling, he may throw his arm downwardly and forwardly and touch the alley floor beyond the foul line. Or he may, to regain his balance, take a long stride forwardly and step on the alley floor considerably beyond the foul line. Fouls of this nature are not intended to be ordinarily detected by the present apparatus (which permits a great simplification of the apparatus) but the player himself is almost always perfectly conscious of the foul which he has committed, and it is glaringly apparent to the onlookers by even casual observation. Hence there is not the same necessity for apparatus to indicate automatically fouls of this nature, as there is for fouls of the more frequent but less easily detected types previously mentioned.

In order to detect and indicate fouls of the types falling within the scope of the present apparatus, each alley is provided at one side, at the foul line, with light projecting means such as the casing 21 having a light bulb 23 therein, and provided with a suitable slit or lens or both, for optically directing and controlling a beam of light to project it across the alley exactly in the vertical plane of the foul line 15 and spaced a slight distance above the alley floor, for example with the center of the beam about ¾ of an inch above the alley floor, the projected beam of light being indicated diagrammatically by the dash line 27. At the opposite side of the alley, in direct alinement with the foul line 15, the beam of light is received by a phototube 31, conveniently of known type 921. So long as the beam of light from the projector 21 falls on the phototube 31, the phototube is conductive to a high degree, but when the player's foot or other obstruction interferes with the beam of light from the projector 21 reaching the phototube 31, the phototube is conductive to a lesser extent or not at all. It is this variation in electrical conductivity of the phototube, in response to the incidence or exclusion of the light beam 27, which initiates operation of the indicating mechanism. Although a beam of light has been mentioned, it will be understood that a beam of so-called "invisible light" or infrared radiation falls within this term as herein used.

Referring now to the diagrammatic representation at the right hand side of Fig. 1, the indicating mechanism comprises, in a very general way, a source of current indicated diagrammatically at 35, signals or indicators operated by such source of current and indicated diagrammatically at 37, and electronic control mechanism indicated diagrammatically at 39 for controlling the operation of the signals 37 in response to variations in conductivity of the phototube 31. The signals 37 may be of any desired kind and number: for example, an audible signal such as a bell or buzzer, and a visual signal such as a light. In addition, the present mechanism includes a plug connection indicated diagrammatically at 41, through which plug connection the control mechanism 39 is electrically attached to or detached from the phototube 31, the current source 35, and the signals 37. This plug connection may be instantly connected or disconnected, so that if any services or repairs are needed with respect to the control parts, the entire control mechanism 39 may be unplugged and taken away as a unit for servicing at a shop where all servicing facilities are conveniently available, and may be replaced by a duplicate unit so as not to interfere with the operation of the bowling alley.

Figure 3:
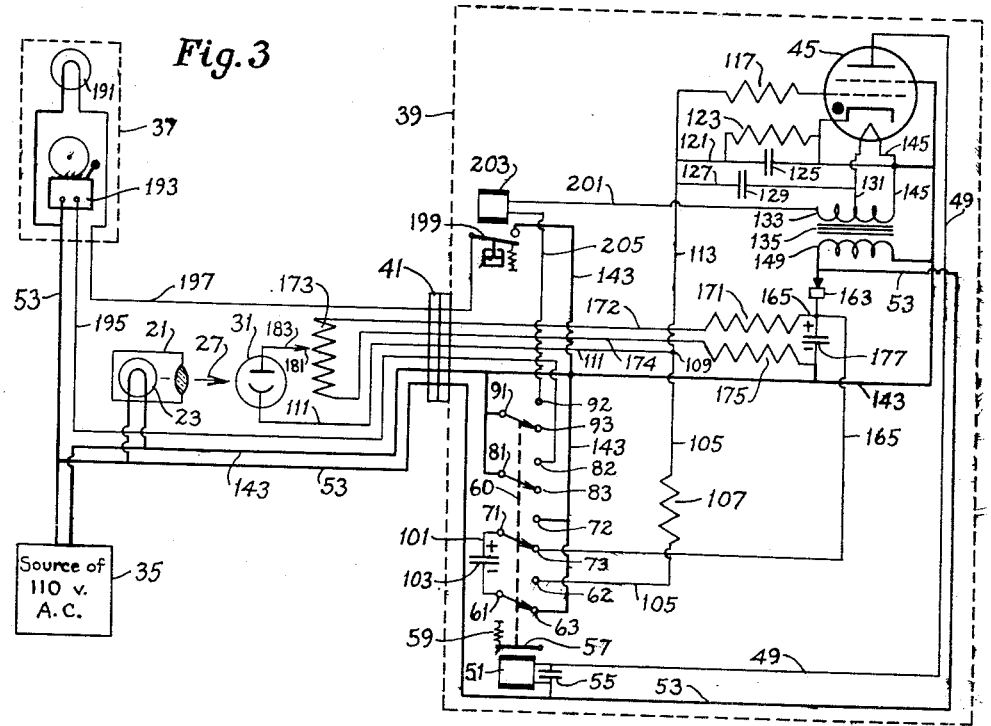
Fig. 3 is a schematic wiring diagram of the electric circuit parts of the present invention.

Reference is now made to Fig. 3 of the drawings, which shows diagrammatically the construction of the control unit and associated parts. The separable or detachable plug 41 is here indicated, and it may conveniently be in the form of a 7 wire or 7 prong plug of conventional design. The source of current 35, the phototube 31, and the signals and certain associated parts are indicated in Fig. 3 as being to the left of the plug 41. The control unit comprises those parts to the right of the plug 41, in Fig. 3, and it may be stated at this point that this entire control unit is of such simplicity and compactness that the box or casing 39 holding the control unit parts may be of a size no larger than about 3 x 4 x 5 inches, weighing no more than about 2½ pounds. With these figures in mind, it is seen that portability of the control unit is real rather than theoretical, and it is a very easy matter for the bowling alley operator, when operating a number of alleys equipped with this invention, to keep a few extra control units on hand. If anything appears to be wrong with the operation of the foul indicator on any one alley, the operator simply takes one of the spare control units and plugs it into the circuit in place of the control unit which appears to be out of order, as easily as or perhaps even quicker than changing an ordinary light bulb. Then the alley operator calls his electronic service man at leisure and gives him the faulty control unit which was unplugged from the circuit, to be tested and repaired in due course and brought back to the alley operator ready for use in the event of any future trouble with any control unit of any alley.

Referring now to the details of the control unit (Fig. 3) the unit comprises a thyratron tube 45, such for example as a type 2050 tube. The anode of this tube is connected by the wire 49 to one side of a relay 51, and through the relay to the wire 53 leading (through the separable plug 41) to the source of current 35, and also to one side of the visual signal 191 and one side of the audible signal 193. The current source 35 may conveniently be any source of 110 volt alternating current, such as the ordinary electric lighting circuit. The relay 51 may conveniently be a conventional type SU17D. A capacitor 55, having a capacity of 1 mfd., is placed in parallel across the relay 51.

The relay has an armature 57 which is normally urged by a spring 59 in a direction away from the relay coil, or upwardly when viewed as in Fig. 3. This armature 57 is mechanically connected, as indicated diagrammatically by the dash line 60, to the movable contact members or switch arms of a four pole double throw switch, forming in effect four switches whose switch arm pivots are indicated at 61, 71, 81, and 91, respectively. The respective switch arms are engaged with the respective contacts 62, 72, 82, and 92 when no current is flowing in the relay 51, so that the armature 57 is in its upper position, and are respectively engaged with the other contacts 63, 73, 83, and 93 of these respective switches when sufficient current is flowing in the relay 51 to pull the armature 57 down against the action of the spring 59.

The switches 61 and 71, on their fixed sides, are connected to each other by the wire 101, in which is interposed a capacitor 103 having a capacity of 0.15 mfd. From the contact 62 of the switch 61, a wire 105 leads through the resistor 107 having a value of 22 megohms, to the junction point 109, whence a wire 111 leads through the plug 41 to the cathode of the phototube 31. From this same junction point 109, a wire 113 leads through a fixed resistor 117 having a value of 1.0 megohm to the first grid or control grid of the tube 45.

A branch 121 leads from the wire 113 through a resistor 123 with a value of about 2.2 megohms, to the cathode of the tube 45. A capacitor 125 with a value of about 0.05 mfd. is connected in parallel with the resistor 123. Another branch 127 leads from the wire 113 through a capacitor 129 having a value of about 0.03 mfd., to a mid point tap 131 of the secondary 133 of the transformer 135.

The other side of the current source 35 (that is, the side which is not connected to the wire 53) is connected to a wire 143 which leads through the separable plug 41 and thence, by means of various branches, to the relay switch parts 63, 72, 81, and 91, as well as to the right end of the primary 149 of the transformer 135, the right end of the secondary 133 of the same transformer, and to the cathode and the second grid or shield grid of the tube 45. The left end of the primary winding 149 is connected by the wire 53 to the first mentioned side of the current source 35. The filament of the tube 45 is supplied with heating current at 6.3 volts by a connection 145 to the right hand end of the secondary winding 133 and a connection to the center tap 131 thereof. The full secondary winding voltage of 12.6 volts is supplied from the left end of the winding 133, through a wire 201, to the coil 203 of an oil dash pot relay, the other side of this coil being connected by the wire 205 to the switch contact 92.

A branch of the wire 53 leads to the selenium rectifier 163, from the opposite side of which a wire 165 leads to the switch contact 73 of the switch 71. Also a branch of this wire 165 leads through the resistor 171 to a wire 172 which, after passing through the separable plug 41, goes to one end of a potentiometer 173. The other end of the potentiometer is connected by a wire 174, again passing through the separable plug 41, to one end of the resistor 175, the other end of which is connected to a branch of the current source line 143. Conveniently the resistor 171 has a value of 47,000 ohms, the potentiometer 173 a value of 20,000 ohms, and the resistor 175 a value of 33,000 ohms. A capacitor 177 having a value of 8 mfd. is connected between those ends of the resistors 171 and 175 which are remote from the member 173, this capacitor thus being connected, in effect, between the wires 143 and 165. The sliding or adjustable contact 181 of the potentiometer 173 is connected by a wire 183 to the anode of the phototube 31.

The signals or indicators comprise preferably a visible signal such as the electric light 191 and an audible signal such as the bell or buzzer 193. As already mentioned, one side of the light 191 and audible signal 193 is connected directly to the current source line wire 53. The second side of the audible signal 193 is connected by a wire 195 passing through the separable plug 41 to the contact 82 of the switch 81.

The second side of the visible signal 191 is connected by the wire 197 passing through the separable plug 41 to one side of the armature switch 199 of the oil dash pot relay 203 above mentioned, the other side of this relay switch being connected to the current line wire 143.

The operation is as follows:

The selenium rectifier 163 provides a direct current voltage of approximately 155 volts positive on the wire 165 and on the adjacent end of the resistor 171. The elements 171, 173, and 175 act as a voltage divider circuit, impressing a positive voltage, through the wire 183, on the anode of the phototube 31. The potential of such positive voltage on the anode is determined by the resistance values of the elements 171 and 175, and by the adjustment of the contact 181 on the potentiometer 173, and this determines, in part, the length of time that the tube 45 remains inoperative after a foul has been committed. The potentiometer is preferably adjusted so as not to exceed approximately 90 volts on the anode, if the phototube 31 is a tube of the kind or type known in the industry as a 921 tube.

The transformer 133, 135, 149, operating directly from the main alternating current supply line, provides the usual 6.3 volts to the heater filament, through the leads 131 and 145, and through the wire 201 it supplies 12.6 volts to the dashpot relay 203. In addition, through the capacitor 129 and wire 127, the secondary of this transformer applies negative potential to the first or control grid of the tube 45, with respect to the positive potential impressed on the anode. To attain this result, correct phasing of the circuit from the secondary of the transformer to the grid, as compared with the circuit connections between the primary of the transformer and the anode, is essential. The matter of phasing is well understood by those skilled in the art, and it will be apparent that if the connections do not give the desired phase relationship, the connections to either the primary or the secondary of the transformer may simply be reversed and the correct phase relationship will then result.

This system is designed to function with the tube 45 normally conducting when the beam of light 27 is falling upon the cathode of the photocell 31, and no signal of a foul is produced while the tube 45 is conducting. When the beam of light 27 falling on the photocell is interrupted for more than a predetermined length of time sufficient for passage of the bowling ball, the tube 45 becomes non-conducting and then the signals 191 and 193 are operated.

At the height of the light beam 27 above the surface of the alley (preferably about ¾ of an inch) the maximum diameter of the bowling ball is considerably above the elevation of the light beam and so as the bowling ball travels down the alley, the light beam intercepts only a relatively short chord of the circular outline of the ball, rather than the full diameter thereof. Even when the ball is propelled rather slowly down the alley, the intercepted chord will pass the light beam in considerably less than a fifth of a second, frequently in as little as a tenth of a second. Yet if the bowler's foot is placed over the foul line and intercepts the light beam, a person with normal reflexes cannot withdraw the foot in less than a fifth of a second, and ordinarily it takes a substantially longer time for withdrawal. Hence the present arrangement is designed with a time delay or lag of approximately one-fifth of a second, so that no indication of a foul is given if the light beam to the photocell is interrupted for a fifth of a second or less, but a signal of a foul is given when the light beam is interrupted for more than a fifth of a second.

With the beam of light falling on the phototube 31 and with the tube 45 in the conducting or operating condition, current flows through the anode circuit or plate circuit of the tube 45, and through the wire 49 and the relay 51, thus operating the relay and pulling the armature 57 against the force of the spring 59, thus pulling all of the switches 61, 71, 81, and 91 to the positions indicated in Fig. 3. In these positions, the switches 81 and 91 are open so that the signal indicators 191 and 193 do not operate. Also, in this position, the wire 165 through the closed switch 73, 71 impresses the full rectified positive potential of approximately 155 volts from the rectifier 163 on one side of the capacitor 103, the opposite or negative side of the capacitor being connected through the switch contact 63 with the line 143.

So long as the light beam continues to fall on the phototube 31, the phototube conducts the current supplied by the potentiometer 173 through the wire 183, and the positive current is thus supplied through the wire 111 from the phototube to the wire 113 leading to the grid of the thyratron tube 45, so that the tube 45 remains in its operating or conducting condition. If the light beam to the phototube 31 is momentarily interrupted for a very short time (less than about one-fifth of a second in the present embodiment) so that current ceases to flow through the phototube, the thyratron tube 45 still remains conducting, however, due to the voltage stored in the capacitor 125. It is the values of the elements 117, 123, and 125 which determine the length of time that the tube 45 will continue to conduct, after the light beam to the phototube 31 is interrupted. This time lag, or length of time of continued operation, may be adjusted or varied by appropriate changes in the values of these elements 117, 123, and 125.

If the light beam to the phototube 31 continues to be interrupted and the phototube thus continues to be non-conducting for more than the set or predetermined length of time (approximately one-fifth second in the present preferred embodiment) so that the grid of the tube 45 becomes sufficiently negative (due to the negative potential supplied by the transformer secondary 133 through the wire 127 and capacitor 129) then the tube 45 ceases to conduct. As soon as the current through the plate circuit 49 of the tube 45 stops, the relay 51 opens under the action of the spring 59, and the movable switch arms of all of the switches 61, 71, 81, and 91 are shifted from the lower contacts to the upper contacts, when viewed as in Fig. 3. The switches 81 and 91 thus closing to the contacts 82 and 92, respectively, complete the circuits to set the signals 191 and 193 in operation. In the case of the visible signal 191, the closing of its switch 91 to the contact 92 completes the cocking circuit of the dash pot relay 203, so that the current furnished by the transformer secondary 133 flows through the relay coil 203, attracting the relay armature 199 to close the relay armature switch to light the signal light 191. The oil dash pot connected to the relay armature keeps this relay armature switch closed for about ten seconds after current stops flowing through the relay coil 203, so that the signal light 191 remains lit for a minimum of ten seconds, insuring adequate observation time. Oil dashpot relays of this kind are well known and are obtainable on the market, the details of construction of the dashpot relay forming no part of the present invention.

Simultaneously with the closing of the switches 81 and 91, the shifting of the switch arms of the switches 61 and 71 to the contacts 62 and 72, respectively, serves to connect the positively charged side of the capacitor 103 to the line 143, and connect the negatively charged side of the capacitor 103 through the resistor 107 to the wires 105 and 113 and the grid of the tube 45. Hence, for the length of time required for the negative charge to leak off from the capacitor 103 through the resistor 107, the grid of the tube 45 will remain negative and the tube will not conduct, even though the interruption of the light beam may have ceased and the phototube may again be conducting. It is ordinarily desired to keep the bell 193 operating for approximately two seconds, to make sure that it is heard by the player and onlookers, and so the values of the elements 103 and 107 are chosen so as to keep the grid of the tube sufficiently negative to prevent the tube from conducting, for about two seconds.

Assuming that the interruption of the light beam 27 has ceased and that the light beam is again falling on the phototube 31, the phototube 31 is again conducting and is supplying positive potential to the grid of the tube 45, bucking the negative potential from the capacitor 103. When the effect of the negative potential from the capacitor 103 has finally been overcome by leaking off through the resistor 107, in about two seconds as above explained, the grid of the tube 45 will become insufficiently negative to prevent electron flow, so that the tube again becomes conducting, whereupon current again begins to flow through the relay 51 in sufficient quantity to operate the relay, pull the armature 57 down against the action of the spring 59, and shift all four of the switches 61, 71, 81, and 91 back to the positions shown in Fig. 3, opening the switches 81 and 91, thus immediately stopping the operation of the bell, stopping the flow of current through the dashpot relay coil 203 so that the light 191 will go out about 10 seconds later, and shifting the switches 61 and 71 so that the capacitor 103 again becomes charged ready for the next foul indication.

The length of time that the signal 193 continues to operate, after being set into operation, depends partly upon the values of the elements 103 and 107 and partly upon the voltage impressed on the phototube by the potentiometer 173 and circuit 183. Hence this length of time can be adjusted by varying either the element 103 or the element 107, or (usually more conveniently) by adjusting the slide 181 on the potentiometer 173, to vary the impressed voltage on the phototube.

The second grid of the tube 45 is a shield grid, and is not essential, but a tube of this kind usually gives more satisfactory operation if a shield grid is employed, as well understood by those skilled in the art.

The resistor 123 has the effect of limiting voltage surges which might otherwise be transmitted to and damage the phototube 31. The resistor 117 serves to isolate the grid of the tube 45, and as a grid load resistor, and it should be placed as close to the tube as possible, preferably being mounted right on the base of the tube.

It should be understood that the voltages, resistances, and capacities of various parts of the circuit which have been mentioned above are given merely as illustrative examples of a satisfactorily operating embodiment. Those skilled in the art will readily understand that all of such factors may be changed without departing in any way from the principles of operation as herein disclosed. Moreover, when it is stated above that the values of a given resistor or capacitor will control a given function or operation, it is meant that such values will effect the major control of such function or operation.

It is realized, of course, that the functioning of the apparatus is also dependent partly on the internal or inherent capacitance and resistance of the various parts of the circuits, including the tube itself.

It is pointed out that the present system in which the tube 45 is normally in a conducting condition, and becomes non-conducting only when a foul occurs, has important advantages over the usual prior system in which an electronic tube is normally non-conducting and becomes conducting only when a foul occurs. An electronic tube of the type 2050 which is here mentioned as an illustrative example, is rather unstable in operation, and it may easily happen that when the tube is non-conducting, it may "fire" or become conducting under the influence of an extraneous electrical disturbance in the neighborhood, such as produced by operation of an electric motor, a doorbell, or a neon sign. Hence if the circuit were designed so that the tube would be normally non-conducting, the operation of extraneous electrical appliances in the vicinity might cause the tube to "fire" with the result of indicating a foul when none actually occurred. But in the present system, the tube is normally operating in a conductive condition, in which condition it is not subject to appreciable influence by extraneous electrical appliances in the vicinity. It is only occasionally, and only for relatively short periods of time, that the tube 45 will be in a non-conducting condition, when a foul has been committed, and thus the time during which the tube is vulnerable or susceptible to influence by extraneous electrical appliances is greatly reduced as compared to the time it would be vulnerable if it operated the other way.

Another advantage of the present system is that when the electricity is turned on at the beginning of the day's operation, the warm-up period of the tube 45 (usually about 10 seconds) serves as a test of the correct functioning of the equipment. When the current is first turned on, the cold tube 45 is, of course, non-conducting, so the light and bell signals 191 and 193 immediately begin to operate. If the various circuits are operating correctly, the bell will cease to operate when the tube has warmed up to conductive condition, and the signal light will go out about ten seconds thereafter, the delay in this case being due to the action of the oil dashpot relay.

Still another advantage of the present arrangement is that the tube is not damaged by turning on the anode current immediately when the filament is turned on. Manufacturers of thyratrons usually recommend a "warm-up" period of ten seconds before anode voltage is applied. In the present construction, however, anode voltage is applied to the cold tube, this being safe because the low current demand (only about 8% of the maximum rated current) prevents damage to the tube, as substantiated by tests both in the laboratory and in the field.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A bowling foul indicator including a phototube, means for projecting a beam of light adjacent a foul line of a bowling alley and toward said phototube in position to be intercepted when a foul is committed, a vacuum tube having a cathode, an anode, and a grid, means for supplying positive potential to said phototube and through said phototube to the grid of said vacuum tube to maintain said vacuum tube in conducting condition while current flows through said phototube, electric signal means including a visible signal, an anode circuit operatively connected to said vacuum tube and normally having a flow of current therein, a relay switch in said anode circuit, means operatively connecting said electric signal means to said relay switch in such manner as to initiate operation of said signal means when current ceases to flow in said anode circuit, circuit means including a resistor and a capacitor in parallel with each other and operatively connecting said cathode and said grid of said tube to each other to maintain the anode circuit of said tube in conducting condition for a relatively short time interval after light ceases to fall on said phototube, sufficient to permit a ball to pass through said beam of light without causing a foul indication, a portable casing containing said vacuum tube and relay switch, said phototube and said signal means being mounted externally of said portable casing, and separable plug connection means associated with said portable casing and interposed in the electric circuits leading from the parts within said portable casing to the parts externally thereof, said portable casing being relatively small and containing all amplifying circuit parts so that all of such amplifying circuit parts may be removed from a bowling alley for convenient inspection and servicing by disconnecting said separable plug and removing said portable casing.

2. An indicator as defined in claim 1, in which said means operatively connecting said visible signal to said relay switch includes a time delay relay of the dashpot relay type to keep said visible signal in operation for an interval of time after reestablishment of flow of current in said anode circuit.

3. A bowling foul indicator including a phototube, means for projecting a beam of light adjacent a foul line of a bowling alley and toward said phototube in position to be intercepted when a foul is committed, a vacuum tube having a cathode, an anode, and a grid, means for supplying positive potential to said phototube and through said phototube to the grid of said vacuum tube to maintain said vacuum tube in conducting condition while current flows through said phototube, electric signal means, an anode circuit operatively connected to said vacuum tube and normally having a flow of current therein, a relay switch in said anode circuit, means operatively connecting said electric signal means to said relay switch in such manner as to initiate operation of said signal means when current ceases to flow in said anode circuit, a capacitor, and capacitor circuit connections leading through said relay switch in such manner that when current is normally flowing in said anode circuit, said capacitor is charged, and when current is not flowing in said anode circuit, the negative side of said capacitor is connected to the grid of said vacuum tube to maintain said grid sufficiently negative to prevent flow of current in said anode circuit for a predetermined minimum time after cessation of flow of current in said anode circuit.

4. An indicator as defined in claim 3, further including a resistor in said capacitor circuit connections leading from said capacitor to said grid.

5. An indicator as defined in claim 4, further including a source of alternating current, and a current rectifier, said means for supplying positive potential to said phototube and for charging said capacitor including circuit connections from said rectifier to said phototube and to said capacitor, respectively.

6. An indicator as defined in claim 5, in which said vacuum tube, relay switch, capacitor, resistor, and rectifier are all mounted in a single portable casing and are electrically connected to said source of current, phototube, and signal means through a multiple-wire separable plug.

7. A bowling foul indicator control unit including a portable casing, a multiple-wire plug having separate connection terminals adapted to be connected to a source of alternating current, to a phototube, and to electric signal means, and electric control parts within said casing, said control parts including a vacuum tube having a filament, a cathode, an anode, and a control grid, a multiple relay switch having an operating coil, a transformer, a rectifier, a capacitor, a resistor, and circuit connections operatively connecting said cathode and the input side of said rectifier and one side of the primary winding of said transformer to the plug connection for one side of said source of current, operatively connecting one side of the operating circuit of said relay switch and the second side of said primary winding to the plug connection for the second side of said source of current, operatively connecting the anode of said vacuum tube to the second side of the operating circuit of said relay switch, operatively connecting the positive rectified side of said rectifier to the plug connection for the anode of the phototube, operatively connecting the control grid of the vacuum tube to the plug connection for the cathode of the phototube, operatively connecting the positive rectified side of said rectifier to one side of said capacitor and the negative side of said capacitor to the plug connection for the first side of said source of current through said relay switch when the latter is in the position it assumes when current is flowing through the operating circuit of the relay switch, operatively connecting the positive side of said capacitor to the plug connection for the first side of said source of current and the negative side of said capacitor to one side of said resistor through said relay switch when the latter is in the position it assumes when no current is flowing through the operating circuit of the relay switch, operatively connecting the second side of said resistor to the control grid of said vacuum tube, operatively connecting the secondary winding of said transformer to the filament of said vacuum tube, and operatively connecting the plug connection for one side of said source of current to the plug connection for said signal means through said relay switch when the latter is in the position it assumes when no current is flowing through the operating circuit of the relay switch.

8. A construction as defined in claim 7, further including a time delay relay mounted in said casing and operatively interposed in the circuit connections of said signal means to keep said signal means in operation for an interval of time after said relay switch assumes its control-current-flowing position.

9. A construction as defined in claim 8, in which said time delay relay is an oil dashpot relay.

WALTER S. SWIFT.

References Cited in the file of this patent

UNITED STATES PATENTS

| Number | Name | Date |
| --- | --- | --- |
| 2,214,274 | Glendenning | Sept. 10, 1940 |
| 2,417,092 | Smith | Mar. 11, 1947 |
| 2,425,255 | MacLagan | Aug. 5, 1947 |
| 2,425,258 | MacLagan | Aug. 5, 1947 |
| 2,455,909 | Smith | Dec. 7, 1948 |